(12) United States Patent
Chernogorski

(10) Patent No.: US 12,726,066 B2
(45) Date of Patent: Sep. 1, 2026

(54) ELECTRIC MACHINE, COMPONENT FOR AN ELECTRIC MACHINE AND MOTOR VEHICLE COMPRISING AN ELECTRIC MACHINE

(71) Applicant: AUDI AG, Ingolstadt (DE)

(72) Inventor: Vladimir Chernogorski, Ingolstadt (DE)

(73) Assignee: Audi AG, Ingolstadt (DE)

( * ) Notice: Subject to any disclaimer, the term of this patent is extended or adjusted under 35 U.S.C. 154(b) by 96 days.

(21) Appl. No.: 18/593,428

(22) Filed: Mar. 1, 2024

(65) Prior Publication Data

US 2024/0313598 A1 Sep. 19, 2024

(30) Foreign Application Priority Data

Mar. 14, 2023 (DE) ......................... 102023106337.5

(51) Int. Cl.
*H02K 3/24* (2006.01)
*H02K 1/24* (2006.01)

(52) U.S. Cl.
CPC ................. *H02K 3/24* (2013.01); *H02K 1/24* (2013.01)

(58) Field of Classification Search
CPC .. H02K 1/24; H02K 3/24; H02K 9/19; H02K 9/197
See application file for complete search history.

(56) References Cited

U.S. PATENT DOCUMENTS 3,652,882 A 3/1972 Elliott
3,821,569 A 6/1974 Sippol et al.
4,360,750 A 11/1982 Pohl
4,513,218 A 4/1985 Hansen
10,454,329 B2 10/2019 Schweinert
11,394,262 B2 7/2022 Schweinert
2002/0047268 A1* 4/2002 Leijon .................... H02H 3/025 290/7
2013/0285487 A1 10/2013 Pyrhonen et al.
2014/0265660 A1 9/2014 Kulkarni et al.
(Continued)

FOREIGN PATENT DOCUMENTS

DE 1513792 A1 9/1969
DE 3434081 A1 5/1985
(Continued)

*Primary Examiner* — Christopher M Koehler
*Assistant Examiner* — Ethan Nguyen Vo
(74) *Attorney, Agent, or Firm* — Seed Intellectual Property Law Group LLP

(57) ABSTRACT

An electric machine is disclosed and may include at least one component configured as a stator or a rotor and a cooling system. The at least one component may include at least two teeth, each extending along a radial direction of the electric machine, and a winding wound about each tooth. At least one of the windings may include a plurality of winding layer groups arranged one above the other with regard to the radial direction. Each of the winding layer groups may include one or more winding layers arranged one above the other. The winding layer groups may each be formed from a separate and electrically conductive conductor wire. The cooling system may be configured such that a cooling fluid is routed through a hollow cross section of at least two conductor wires such that at least two of the winding layer groups are fluidly coupled in parallel.

17 Claims, 8 Drawing Sheets

(56) References Cited

U.S. PATENT DOCUMENTS

| | | | | |
|---|---|---|---|---|
| 2020/0082968 | A1* | 3/2020 | Rippel | H02K 3/24 |
| 2020/0373797 | A1* | 11/2020 | Culleton, III | H02K 1/2713 |
| 2021/0328472 | A1* | 10/2021 | Diehl | H02K 3/24 |
| 2022/0302795 | A1* | 9/2022 | Barden | H02K 1/32 |
| 2022/0320933 | A1* | 10/2022 | El-Refaie | H02K 9/19 |
| 2023/0179066 | A1* | 6/2023 | Toliyat | H02K 9/20 310/54 |

FOREIGN PATENT DOCUMENTS

| | | | | |
|---|---|---|---|---|
| DE | 202012007645 | U1 | 11/2013 | |
| DE | 102013205506 | A1 | 10/2014 | |
| DE | 102017119033 | A1 | 2/2019 | |
| DE | 102018218668 | A1 * | 4/2020 | H02K 9/197 |
| DE | 102020114683 | A1 | 12/2021 | |
| EP | 3633825 | A1 | 4/2020 | |
| GB | 1105807 | A | 3/1968 | |
| RU | 2004117786 | A | 11/2005 | |
| WO | WO 2015150556 | A1 | 10/2015 | |
| WO | WO 2017055246 | A2 | 4/2017 | |
| WO | WO 2020049830 | A1 | 3/2020 | |
| WO | 2020240173 | A1 | 12/2020 | |

* cited by examiner 10
9
11
IV
57
39, 40
16
3, 4
39, 41
6
58
12
16
49, 24
21
47
22
13

ELECTRIC MACHINE, COMPONENT FOR AN ELECTRIC MACHINE AND MOTOR VEHICLE COMPRISING AN ELECTRIC MACHINE

BACKGROUND

Technical Field

The present disclosure relates to an electric machine, specifically a component for the electric machine and an associated cooling system. The present disclosure also relates to a motor vehicle comprising an electric machine.

Description of the Related Art

With regard to a housing of an electric machine, the electric machine typically comprises a fixed stator and a rotor that is rotatably mounted about an axis of rotation. If the electric machine is designed as an internal rotor, then the rotor, with regard to its axis of rotation, is arranged in an area located radially further inward than the stator. If the electric machine is designed as an external rotor, then the rotor, with regard to this axis of rotation, is arranged in an area that is radially further outward than the stator.

To operate the electric machine, its windings are energized by an electrical current, which causes the windings to heat up. Consequently, cooling of the windings is necessary, for which purpose a cooling fluid is passed, for example, through a rotor shaft or through a rotor core of the rotor. Corresponding systems are known, for example, from DE 202012007645U1 or WO2020/049830A1. However, such cooling concepts, in particular so-called rotor shaft cooling, are disadvantageous because the cooling effect only occurs indirectly. This means that the heat is not transferred to the cooling fluid directly at its point of origin, i.e., in the area of the windings, but instead must first be transferred from the winding to the rotor shaft or to the rotor core, whereby the cooling effect is weakened. As a countermeasure, it is known from the prior art to route the cooling fluid for direct cooling of the windings through the conductor wires designed as hollow guides. Systems of this kind are known, for example from DE102020114683A1, DE102013205506A1, DE 102017119033A1, WO2017/055246A2, WO2015/150556A1, DE102013205506A1 or U.S. Pat. No. 3,821,569A.

BRIEF SUMMARY

The present disclosure provides an electric machine with a conductor wire which forms a winding and through whose hollow cross section a cooling fluid can be routed.

According to the present disclosure, an electric machine may include at least one component forming either a stator or a rotor, which has at least two teeth each extending along a radial direction of the electric machine and having a winding wound about them, wherein at least one of the windings may include a plurality of winding layer groups arranged one above the other with regard to the radial direction. Each of the winding layer groups may include one or more winding layers arranged one above the other. The winding layer groups may each be formed from a separate and electrically conductive conductor wire. The electric machine may have a cooling system configured such that a cooling fluid may be routed through a hollow cross section of at least two conductor wires in such a way that at least two of the winding layer groups are fluidically connected in parallel.

By way of the electric machine, a traction torque may be generated, which may be transmitted to the wheels of a motor vehicle via a drive train. In the present disclosure the cooling fluid stream supplied to the winding is divided into several partial streams which are supplied to different winding layer groups. The partial streams do not flow through the entire winding, but only through a part thereof, namely the respective winding layer group, as a result of which the cooling effect increases. The cooling fluid may be a gas, such as air, or a cooling liquid, such as water or oil.

According to the present disclosure, at least one of the windings may have a plurality of winding layer groups arranged one above the other with regard to the radial direction. Each of the winding layer groups may have one winding layer or a plurality of winding layers arranged one above the other, and each of the winding layer groups may be formed from a separate conductor wire. The winding in such embodiments comprises a plurality of conductor wires, wherein these conductor wires or the winding layer groups may be electrically connected in series with one another. In such embodiments, the respective winding may be formed from a conductor which is interrupted in its longitudinal direction, the pieces of this conductor being formed from the separate conductor wires.

Each of the winding layers may extend along the entire circumference of the respective tooth or may completely enclose the tooth laterally. The winding layer may include at least one winding turn of the conductor wire, which surrounds or revolves about the tooth by 360° or completely exactly once. If the winding layer has several winding turns, then, when viewed in the radial direction, the winding layer may have a spiral-shaped structure that is perpendicular to the radial direction. In such embodiments, the winding turns may be arranged concentrically about the respective tooth within a winding layer.

Definitions of relevant spatial directions in the electric machine according to the present disclosure are introduced below. A rotor shaft of the rotor is thus rotatably mounted about an axis of rotation, which extends along a longitudinal direction of the electric machine. The radial direction extends perpendicular to the longitudinal direction. A circumferential direction is perpendicular to the radial direction. This means that a point rotating about the axis of rotation moves along the circumferential direction. If one of these directions is mentioned without specific reference, it refers to the electric machine according to the definitions just introduced. The longitudinal, radial and circumferential directions with regard to the component correspond to the longitudinal, radial and circumferential directions of the electric machine.

The conductor wire forming a winding layer group may have an input-side end section and/or an output-side end section. The end sections may include the front ends or end faces of the respective conductor wire, such that the inlet opening of the cooling channel is arranged in the area of the input-side end section and/or the outlet opening of the cooling channel is arranged in the area of the output-side end section. The input-side end section and/or the output-side end section may, with regard to the longitudinal direction of the respective tooth or the respective winding, protrude laterally from this winding in order to facilitate or enable fluidic and/or electrical contacting of this winding.

According to the present disclosure the tooth or at least a section of the tooth may extend along the radial direction.

The winding may enclose the respective tooth laterally, with regard to the radial direction or the longitudinal direction of the tooth. Accordingly, a longitudinal direction of the conductor wire or the winding may extend at least largely perpendicular to the radial direction.

The conductor wire forming the winding may have a hollow cross section. This means that the conductor wire may have a cooling channel in its interior, which extends along the longitudinal direction of the conductor wire and is closed laterally. The longitudinal direction of the conductor wire and the longitudinal direction of the cooling channel are identical. The conductor wire may have an opening at its ends, i.e., at its end faces, each of which forms an inlet or an outlet opening of the cooling channel. The cooling fluid may be supplied to the conductor wire via one of these openings and discharged via the other opening.

The conductor wire may be electrically conductive and therefore consists of an electrically conductive material, such as a metal such as copper. The outer cross section of the conductor wire may be round, such as elliptical or circular, or rectangular, such as with rounded corners. The same applies to an inner cross section of the conductor wire forming the outer cross section of the cooling channel.

The electric machine according to the present disclosure may be configured as a salient pole synchronous machine. Salient-pole synchronous machines may be DC-powered, synchronous machines in which windings are energized to generate the DC excitation field. In contrast to non-salient pole machines, in which the rotor has longitudinal grooves in which the windings are received, in salient-pole synchronous machines, teeth of the stator or rotor forming pole shoes are provided, about which the windings are wound. Salient-pole synchronous machines are often implemented as internal rotors. If in this case the salient pole synchronous machine is implemented as an external pole salient pole machine, the teeth are arranged on the stator. In a salient pole synchronous machine implemented as an inner pole salient pole machine, the teeth are arranged on the rotor. The electric machine according to the present disclosure may be configured as an internal rotor, in which the component is the rotor, such that the electric machine is an inner-pole salient pole machine.

In some embodiments, the electric machine according to the present disclosure may have one or more fluidic input connection components, by way of which input-side end sections of the conductor wires of at least two winding layer groups may be fluidically connected to one or more supply chambers, which may be fluidically connected upstream of these conductor wires, such that the winding layer groups are fluidically connected in parallel. The cooling fluid stream flowing through the supply chamber may be divided into several partial streams at the fluidic input connection component, which partial streams are supplied accordingly to different winding layer groups. The fluidic input connection component may include a plastic or a metal.

One or more fluidic output connection components may be included, by way of which output-side end sections of the conductor wires of at least two winding layer groups are fluidically connected to one or more discharge chambers, which may be fluidically connected downstream of these conductor wires. After flowing through the respective winding layer group, the cooling fluid may be supplied to the discharge chamber via the output-side end section and the fluidic output connection component. The partial streams flowing through the respective winding layer groups may combine in the respective fluidic output connection component. The fluidic output connection component may be a plastic or a metal.

The electric machine according to the disclosure may have one or more feed parts, which may be arranged next to at least one of the windings with regard to a longitudinal direction of the electric machine. At least one of the plurality of supply parts may be configured as a supply part, and have at least one of the plurality of supply chambers. At least one of the plurality of feed parts may be configured as a discharge part and have at least one of the plurality of discharge chambers. The supply part may be a component made of metal or plastic.

In some embodiments, at least one of the plurality of feed parts may be formed annularly and may be arranged concentrically about the or a rotor shaft of the component forming the rotor which extends along the longitudinal direction and is rotatably mounted. At least one of the plurality of supply chambers and/or at least one of the plurality of discharge chambers may be formed annularly and may be arranged concentrically about the rotor shaft. The feed part may be attached to the component, such as to the rotor shaft and/or the teeth. In some embodiments, the supply chamber may be fluidically connected upstream of all winding layer groups of all windings and/or the discharge chamber may be fluidically connected downstream of all winding layer groups of all windings.

In some embodiments, at least one of the plurality of fluidic input connection components and/or at least one of the plurality of fluidic output connection components may be attached to the feed part. In some embodiments, the feed part may have at least one receiving opening which opens into the supply chamber or the discharge chamber, with the connecting component being inserted into the receiving opening. In some embodiments, both the supply part and the discharge part are provided, with the respective winding being arranged in between, with regard to the longitudinal direction.

The electric machine may have one or more electrical connection components, each of which connects end sections of the conductor wires of two adjacent winding layer groups of one of the windings to one another, such that these winding layer groups are electrically connected in series. Although the winding in such embodiments does not have one continuous conductor wire but instead has a plurality of conductor wires, at least the conductor wires of the winding layer groups connected by way of the electrical connection component form an electromagnetic field coil due to the fact that they are electrically connected in series. In order to produce the winding, no single, continuous or uninterrupted piece of conductor wire must be wound about the tooth, but instead shorter pieces of conductor wire may be positioned accordingly. The electrical connection component may consist of an electrically conductive material, such as a metal such as copper. The electrical connection component may include an electrically insulating material, such as a plastic, and may have an electrically conductive connecting element, by which the electrical contacting of the respective end sections may be implemented.

In some embodiments, the end sections of the conductor wires of all pairwise adjacent winding layer groups of the respective winding may be connected to one another via an electrical connection component, such that all winding layer groups of the respective winding are electrically connected in series one after the other.

In some embodiments, at least one common connection component may be provided, which forms one of the at least one fluidic connection components and one of the at least one electrical connection components. In such embodiments, the common connection component may be provided as a common component which, on the one hand, implements the electrical connection component or one of the electrical connection components and, on the other hand, the fluidic connection component or one of the fluidic connection components.

In some embodiments, the at least one common connection component may include a base body made of an electrically conductive material, which may be a metal such as copper. The base body may have at least one channel and/or at least one chamber through which the cooling fluid can be routed. The channel or the chamber may be fluidically arranged between the supply or discharge chamber and the respective conductor wire. The respective end sections may be in contact with the electrically conductive base body, such that the electrical contact is implemented in such a way.

With regard to the cooling system, the cooling system may form a cooling circuit in which the cooling fluid can be conveyed by way of a conveying means or device. In such embodiments, the cooling fluid may circulate from the conveying means or device to the windings and back again and is therefore circulated accordingly. The conveying means or device may be a cooling fluid pump. A cooling device for cooling the cooling fluid, such as a heat exchanger, may be integrated into the cooling system.

A rotor shaft of the component configured as the rotor, which extends along a longitudinal direction of the electric machine and is rotatably mounted, may have or delimit at least one supply channel and/or at least one discharge channel. The supply channel and/or the discharge channel may extend at least in sections along the longitudinal direction of the rotor shaft. The supply channel may lead from the conveying means or device to at least one of the conductor wires having the hollow cross section. The discharge channel may lead from at least one of the conductor wires having the hollow cross section to the conveying means or device. The supply channel and/or the discharge channel may be designed as a central, longitudinal bore in the rotor shaft. The supply channel and/or the discharge channel may have a hollow cylindrical or sleeve-like geometry and extend between the rotor shaft and a rotor shaft sleeve, such as a rotationally fixed rotor shaft sleeve, in which the rotor shaft is arranged or mounted.

The cooling circuit may comprise a movable section and a fixed section. In the movable section, the cooling fluid may be routed through rotating components of the electric machine, such as through the rotor. In the fixed section, the cooling fluid may be routed through stationary components of the electric machine, such as through the conveying means or device. To transfer the cooling fluid from the fixed section to the movable section, the cooling fluid may be introduced into the supply channel using a delivery lance. To transfer the cooling fluid from the movable to the fixed section, the cooling fluid may flow through at least one transverse bore and/or lateral opening in the rotor shaft.

In some embodiments, the component may be assembled from a plurality of parts, with at least two of the parts having at least one of the teeth in each case. Such embodiments may include those in which the electric machine is configured as a salient-pole synchronous machine. Such embodiments enable conductor wires through which cooling fluid flows, even in salient-pole synchronous machines. The windings in salient-pole synchronous machines are typically formed by winding the conductor wire about the tooth, for example using a winding needle. However, this requires sufficient resiliency of the conductor wire, since only a limited space is available for guiding the winding needle due to the adjacent arrangement of the teeth to one another. This causes the conductor wire to be bent to such an extent during the winding process that conductor wires with hollow cross sections are fundamentally not suitable for this purpose. Conductor wires with a hollow cross-sectional geometry typically have too high a mechanical rigidity, so that there is no bendability required for winding using a winding needle.

Such issues in connection with the production of salient-pole synchronous machines may be overcome by the multi-part or multi-piece structure of the component. This multi-piece nature enables the conductor wire to be wound about the tooth, such as by using the winding needle, before the parts of the component are assembled to form the final stator or rotor. As the teeth are not yet in their final relative position to one another in this state, a larger tool guide area, which extends about the respective tooth, may be available for the winding needle. The parts of the component may be assembled or attached to one another after the conductor wires have been wrapped about the tooth. Welding, soldering, screwing, riveting connections, and/or interlocking toothings of the respective components may be utilized to assemble or attach the parts of the component. The parts may include iron, such as laminated iron, with the joined parts forming a yoke in some embodiments.

In the electric machine according to the present disclosure, at least one of the parts, or each of the parts in some embodiments, may be segment-like. With regard to the assembled state of the component, the segment-like part may be pie-like when viewed along the longitudinal direction, i.e., can have two lateral outsides that are at an angle and are in contact with the lateral outsides of adjacent parts. The opening angle of the circle segment describing the part, i.e., the angle between its lateral outsides, may be identical for all parts and may be 60°. In such embodiments, the component may be composed of six parts, which may be identically shaped. The lateral outsides may converge to a point radially on the inside or may be separated from one another via an inner outside of the respective part. The lateral outsides may be separated from one another radially on the outside via an outer outside of the respective part. The inner outside and/or the outer outside may be curved in a circle when viewed along the longitudinal direction.

In the electric machine according to the present disclosure, at least one of the parts, each of the parts in some embodiments, may have exactly one tooth. The tooth or, if the respective part has a plurality of teeth, the teeth may be distributed on the outside along the circumferential direction. With regard to the assembled state of the component and when viewed along the longitudinal direction, the teeth may result in a star-like structure, in which the teeth are arranged equidistantly along the circumferential direction. If the opening angle of each of the parts is 60° and each of the parts also has exactly one tooth, the component comprises exactly six teeth. Receiving grooves through which the windings extend may be formed between adjacent teeth.

If the component is configured as the rotor the parts may be arranged along a circumference of the rotor shaft which extends along the longitudinal direction of the electric machine and is rotatably mounted. The parts may be arranged next to each other along the circumferential direction. The inner outside of the part may be in contact with the rotor shaft and may be attached thereto. The inner outside of the part and a radial outside of the rotor shaft may each have toothings that engage in one another or are interlocked. The longitudinal direction of the toothings may extend along the radial directions. A width direction of the toothings, along which their cross sections remain the same, may extend along the longitudinal direction. This means that the parts may be attached to the rotor shaft along the longitudinal direction for assembly. To attach the parts to the rotor shaft, welding, soldering, screwing, and/or riveting connections may be provided in addition to or as an alternative to interlocking.

The rotor shaft may be connected to the housing via at least one bearing, which may be a ball or roller bearing. The rotor shaft may be coupled to or form an input and/or output shaft of the electric machine. Accordingly, a torque may be transferred from the rotor shaft, such as via the input and/or output shaft, to the drive train of the motor vehicle, and/or vice versa.

In some embodiments, each of the teeth is T-shaped with a longitudinal bar and a cross bar, the longitudinal bar extending along the radial direction, with the conductor wire being wound about the longitudinal bar. With regard to the assembled state, the longitudinal direction of the longitudinal bar may extend along the radial direction and the longitudinal direction of the cross bar extends along the circumferential direction. The cross bar may be curved radially on the outside, so that an air gap, such as an air gap with a constant width, is formed between this outer surface of the tooth and the stator or rotor. The tooth may implement a pole shoe which brings about a desired, such as sinusoidal, field shape of the magnetic field generated by the winding towards the air gap.

The present disclosure further relates to a component for an electric machine, configured as a stator or a rotor and having at least two teeth, each of which is extending along a radial direction of the component and each having a winding wound about them. At least one of the windings may have a plurality of winding layer groups arranged one above the other with regard to the radial direction and each of the winding layer groups may include one or more winding layers arranged one above the other. Each of the winding layer groups may be formed from a separate and electrically conductive conductor wire, wherein a cooling fluid of a cooling system of the electric machine may be routed through a hollow cross section of at least two conductor wires such that at least two of the winding layer groups are fluidically connected in parallel. All advantages and features explained in connection with the electric machine according to the present disclosure may be similarly transferred to the component according to the present disclosure, and vice versa.

The present disclosure further relates to a motor vehicle comprising an electric machine according to the above description. All advantages and features explained in connection with the electric machine according to the present disclosure and the component according to the present disclosure may be similarly transferred to the motor vehicle according to the present disclosure, and vice versa.

The electric machine may be connected to a drive train of the motor vehicle or may be a component of one, such that torque may be transferred from the electric machine to wheels of the motor vehicle, and/or vice versa. Specifically, the rotor or a rotor shaft of the rotor, which may form an input and/or output shaft of the electric machine, may be coupled to a drive train of the motor vehicle, such that a rotation of the rotor or the rotor shaft is transmitted to components of the drive train, and vice versa. In addition to a drive shaft and the wheels, the drive train may include other components that enable torque transmission between the electric machine and the wheels of the motor vehicle, such as a transmission, a clutch, and/or a differential, or the like. Details are well known to those skilled in the art and will not be explained in more detail here.

The electric machine may be operable in a drive mode in which it generates a traction torque to drive the motor vehicle. In this mode, the electrical energy stored in an electrical energy storage unit of the motor vehicle may be converted into kinetic energy of the motor vehicle by way of the electric machine. The accelerating or positive torque generated by the electric machine may be transmitted to the drive train and therefore to the wheels. Specifically, the windings may be electrically energized using the energy stored in the electrical energy storage unit, whereby magnetic fields are induced by the windings. These magnetic fields may interact with magnetic fields of other coils or permanent magnets of the electric machine such that the positive torque may be generated.

The electric machine may be operated in a recuperation mode in which it generates a deceleration torque for slowing down the motor vehicle. In this mode, the kinetic energy of the motor vehicle may be converted into electrical energy by way of the electric machine. Such electrical energy may be stored in the electrical energy storage unit of the motor vehicle and/or may be used for operating electrical devices of the motor vehicle. For this purpose, the decelerating or negative torque present at the rotor may be transmitted to the drive train and via the drive train to the wheels. Specifically, the magnetic fields of further coils or permanent magnets may cause the induction of an electrical current in the windings, with the corresponding electromagnetic interaction causing the negative torque and the current induced in the windings may be used, for example, to charge the electrical energy storage unit.

BRIEF DESCRIPTION OF THE SEVERAL VIEWS OF THE DRAWINGS

FIG. 6 shows a perspective view of one of the windings of the component of the electric machine of FIG. 2.

DETAILED DESCRIPTION

Figure 1:
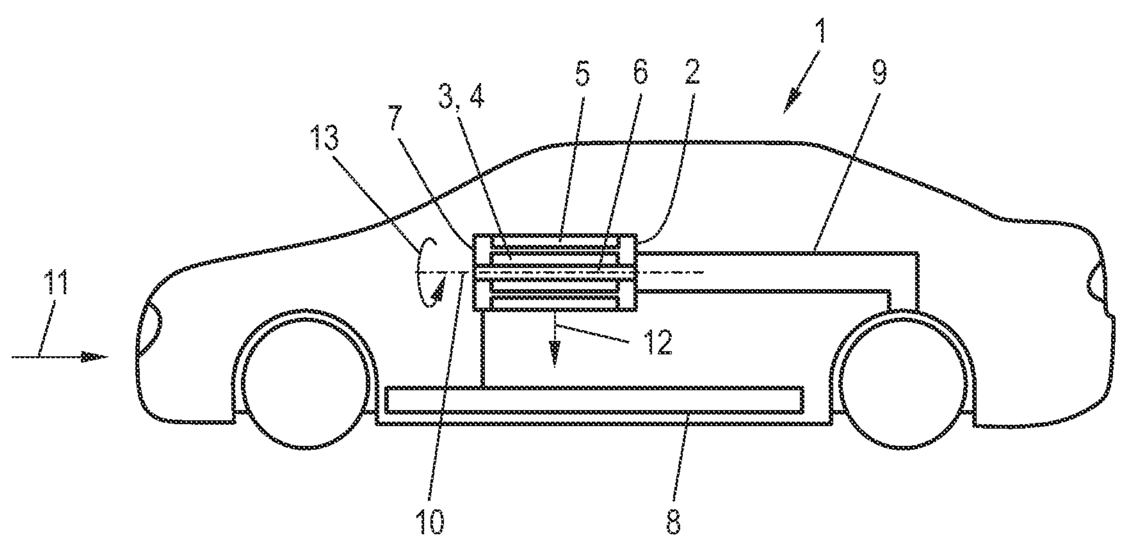
FIG. 1 shows a schematic diagram of a motor vehicle comprising an electric machine with a component.

FIG. 1 shows a motor vehicle 1 according to the present disclosure according to an exemplary embodiment, comprising an electric machine according to the present disclosure according to an exemplary embodiment. Electric machine 2 comprises a component 3 according to the present disclosure according to an exemplary embodiment, which in the present embodiment is a rotor 4 of electric machine 2. Furthermore, electric machine 2 comprises a stator 5.

Electric machine 2 may be a salient-pole synchronous machine, configured, for example, as an internal rotor. Rotor 4 is arranged in an area of electric machine 2 that is radially further inward than an area in which stator 5 is arranged. A rotor shaft 6 of rotor 4 is rotatably mounted on a housing 7 of electric machine 2, for example, by way of a ball or roller bearing. Rotor shaft 6 may be arranged in a rotor shaft sleeve 58, in particular arranged in a rotationally fixed manner, which will be discussed in more detail below.

Electric machine 2 may be configured to be operated in a drive mode in which electrical energy stored in an electrical energy storage unit 8 of motor vehicle 1 is converted into kinetic energy of motor vehicle 1. A generated drive torque, which may be used to propel motor vehicle 1, may be transferred from electric machine 2 to a drive train 9 of motor vehicle 1. The drive torque may only be transferred to the rear wheels, but may also or alternatively be transferrable to the front wheels. Electric machine 2 may also be operated in a recuperation mode, in which kinetic energy of motor vehicle 1 is converted into electrical energy by way of electric machine 2, which may be used, for example, to charge electrical energy storage unit 8.

Below, with reference to electric machine 2, definitions with regard to relevant spatial directions are introduced. For example, rotor shaft 6 is rotatably mounted about an axis of rotation 10, which extends along a longitudinal direction 11 of electric machine 2. A radial direction 12 extends perpendicular to longitudinal direction 11. A circumferential direction 13 is perpendicular to radial direction 12. This means that a point rotating about axis of rotation 10 moves along circumferential direction 13.

Figure 2:
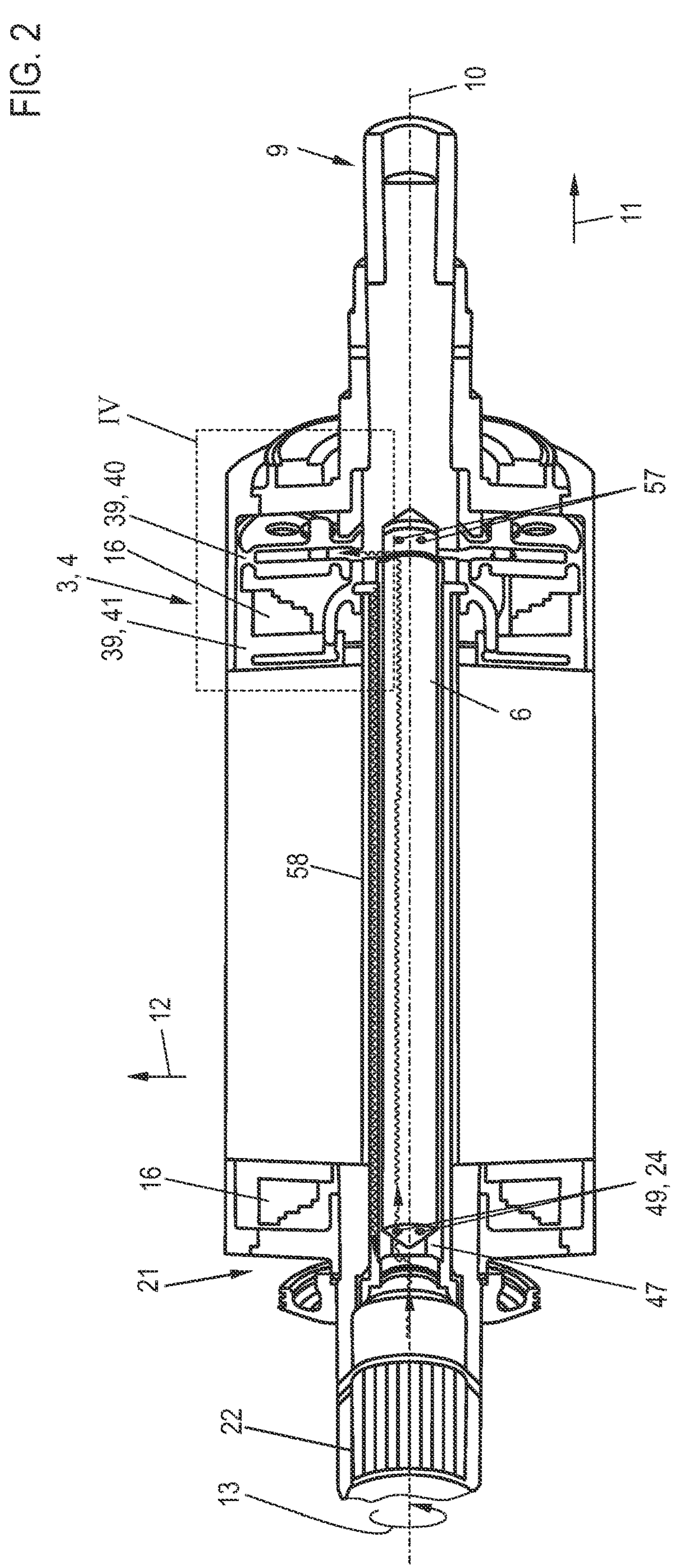
FIG. 2 shows a longitudinal section through the electric machine of the motor vehicle of FIG. 1.
Figure 3:
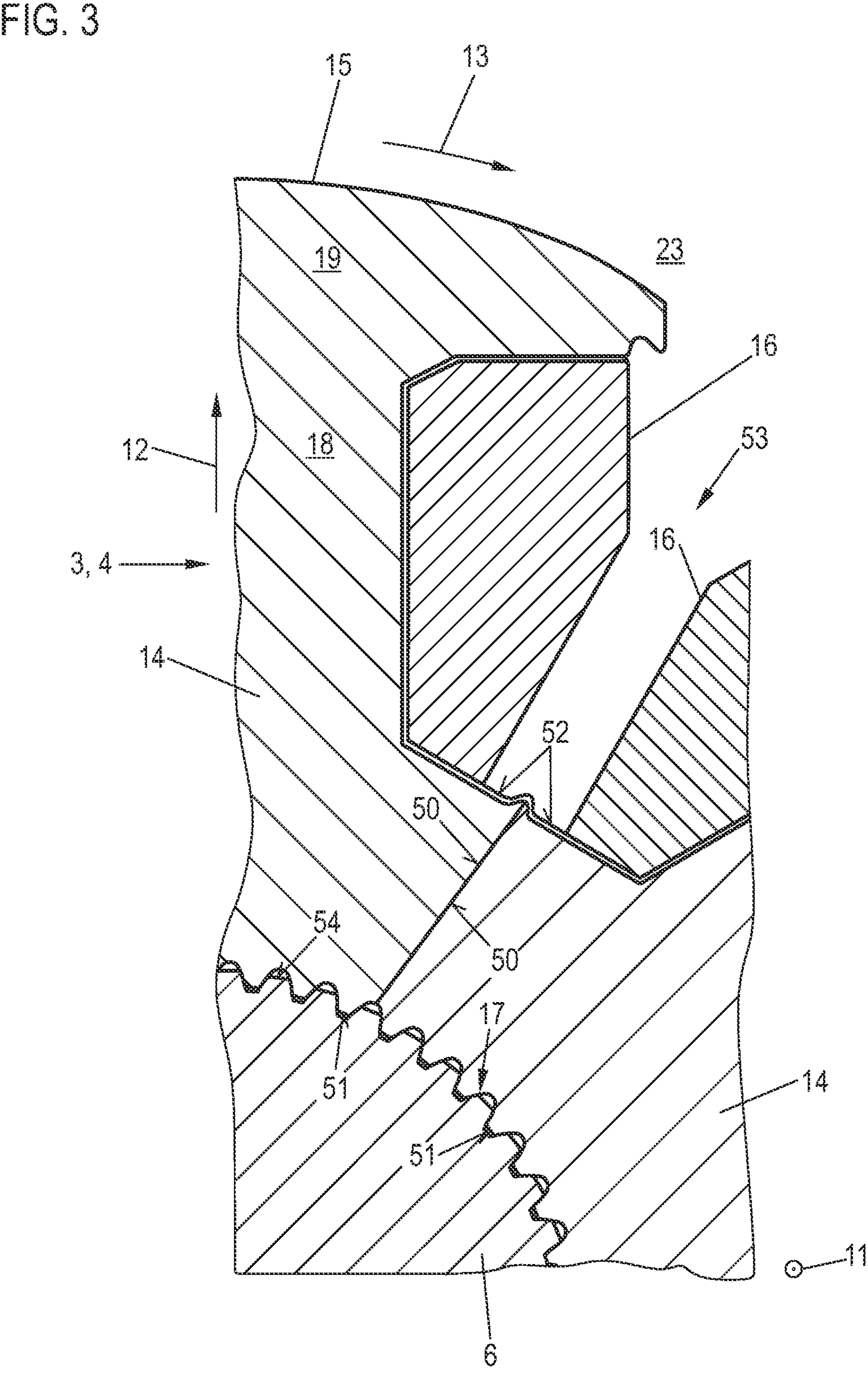
FIG. 3 shows an enlarged representation of a cross section of the electric machine of the motor vehicle of FIG. 1.

Details with regard to component 3 and rotor 4 are explained below with reference to FIGS. 2 and 3. FIG. 2 shows a sectional view of component 3, the sectional plane running along axis of rotation 10. FIG. 3 shows a sectional view of component 3, the sectional plane being perpendicular to axis of rotation 10. FIG. 3 shows that component 3, i.e., rotor 4, may be composed of a plurality of parts 14. Each of parts 14 may include a tooth 15 extending along radial direction 12, about which a winding 16 may be wound. Component 3 may be produced by assembling component 3 from plurality of parts 14, with conductor wires 20 of windings 16 previously being wound about respective tooth 15.

Details about the geometry of parts 14 are explained below. For example, exactly one tooth 15 may be provided for each part 14. Each of the total of six parts 14 may be segment-like. A total of six teeth 15 may be provided along circumferential direction 13, which may form a star-like structure. Receiving grooves 53 may be formed between adjacent teeth 15, in which windings 16 may be arranged or through which windings 16 may extend.

Each of segment-like parts 14 may include two lateral outsides 50 which may be at an angle to one another and which may be in contact with lateral outsides 50 of adjacent parts 14. The opening angle between lateral outsides 50 may be identical for all parts and may be 60°. Lateral outsides 50 may converge to a point radially on the inside or, as in the present exemplary embodiment, may be separated from one another via an inner outside 51 of respective part 14. The inner outside 51 may be circularly curved when viewed along longitudinal direction 11. Lateral outsides 50 may be separated from one another radially on the outside via an outer outside 52 of respective part 14, with tooth 15 being arranged on outer outside 52. Lateral outsides 50, which may be at an angle to one another, may be arranged at a distance from one another, with inner outside 51 and outer outside 52 extending between them. Outer outside 52 in each case may represent part of a groove base of one of receiving grooves 53.

Parts 14 may be arranged next to one another on rotor shaft 6 along circumferential direction 13. Inner outside 51 of respective part 14 may be in contact with rotor shaft 6 and may be attached thereto. Specifically, each of inner outside 51 of respective part 14 and a radial outside 54 of rotor shaft 6 may have a toothing 17. The toothings 17 may engage in one another. For attaching parts 14 to the rotor shaft, additionally or alternatively, a welding, a soldering, a screwing, and/or a riveting connection may be provided.

Each of the teeth 15 may be T-shaped with a longitudinal bar 18 and a cross bar 19, the longitudinal direction of longitudinal bar 18 may extend along radial direction 12 and the longitudinal direction of cross bar 19 may extend along circumferential direction 13. Winding 16 may be wound about longitudinal beam 18. Cross bar 19 may be bent radially on the outside, with an air gap 23 a few millimeters wide forming between tooth 15 forming a pole piece and stator 5, which is not shown in FIG. 3.

Details with regard to windings 16 are explained below with reference to FIG. 4, which represents an enlarged view of the box marked IV in FIG. 2. Each of windings 16 may be formed from electrically conductive conductor wires 20, each of which may have hollow cross sections to form a cooling channel 26 through which a cooling fluid may be routed. In some embodiments, the cooling fluid may, for example, be a cooling liquid, namely water or oil. Each of the conductor wires 20 may be a metal, namely copper. The outer cross section of conductor wire 20 may, for example, be rectangular and have rounded corners. In some embodiments, the outer cross section may be round, such as elliptical or circular. The inner cross section of conductor wire 20, that is to say an outer cross section of cooling channel 26 formed by respective conductor wire 20, may be circular. However, this internal cross section may also be elliptical or rectangular and may have rounded corners.

Each of conductor wires 20 has one of cooling channels 26, which extends along the longitudinal direction of respective conductor wire 20 and is closed laterally. Each of conductor wires 20 may have an opening exclusively on its front or end ends, i.e., on its end faces, each of which may form an inlet or an outlet opening of cooling channel 26. The cooling fluid may be supplied to conductor wire 20 or cooling channel 26 via one of these openings and may be discharged from conductor wire 20 or cooling channel 26 via the other opening in each case.

Furthermore, electric machine 2 has a cooling system 21 (see FIG. 2) which forms a cooling circuit in which the cooling fluid may be conveyed by way of a conveying means or device 22, which in some embodiments may be a cooling fluid pump. The cooling circuit or part of the path that the cooling fluid takes when flowing through the cooling circuit is indicated in the figures by wavy arrows. To route the cooling fluid, rotor shaft 6 may have a supply channel 24 extending along the longitudinal direction 11, which may be a central or longitudinal bore of rotor shaft 6, and a discharge channel 25 running parallel thereto. Further details with regard to channels 24, 25 are explained below.

Figure 6:
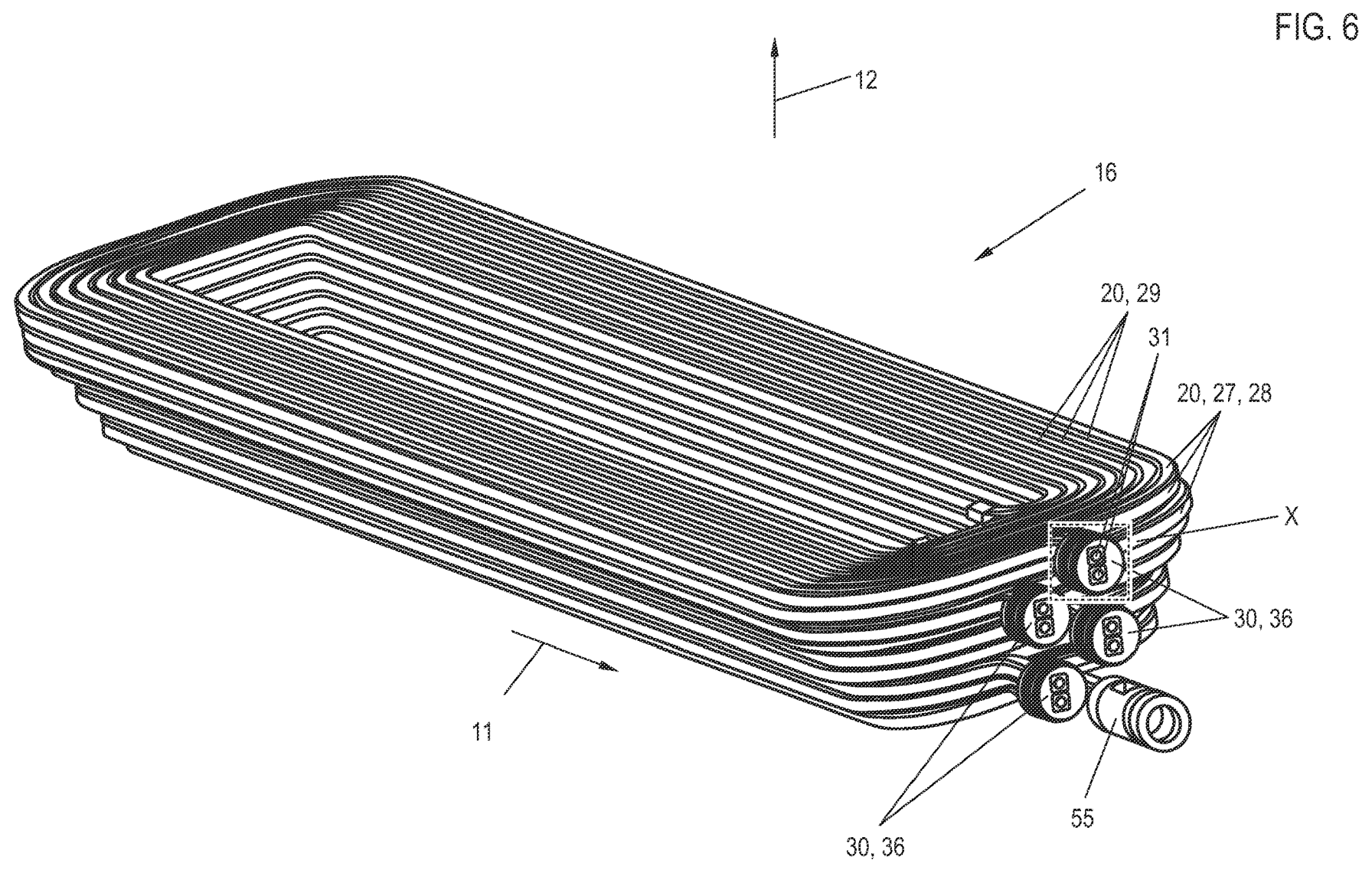
Figure 7:
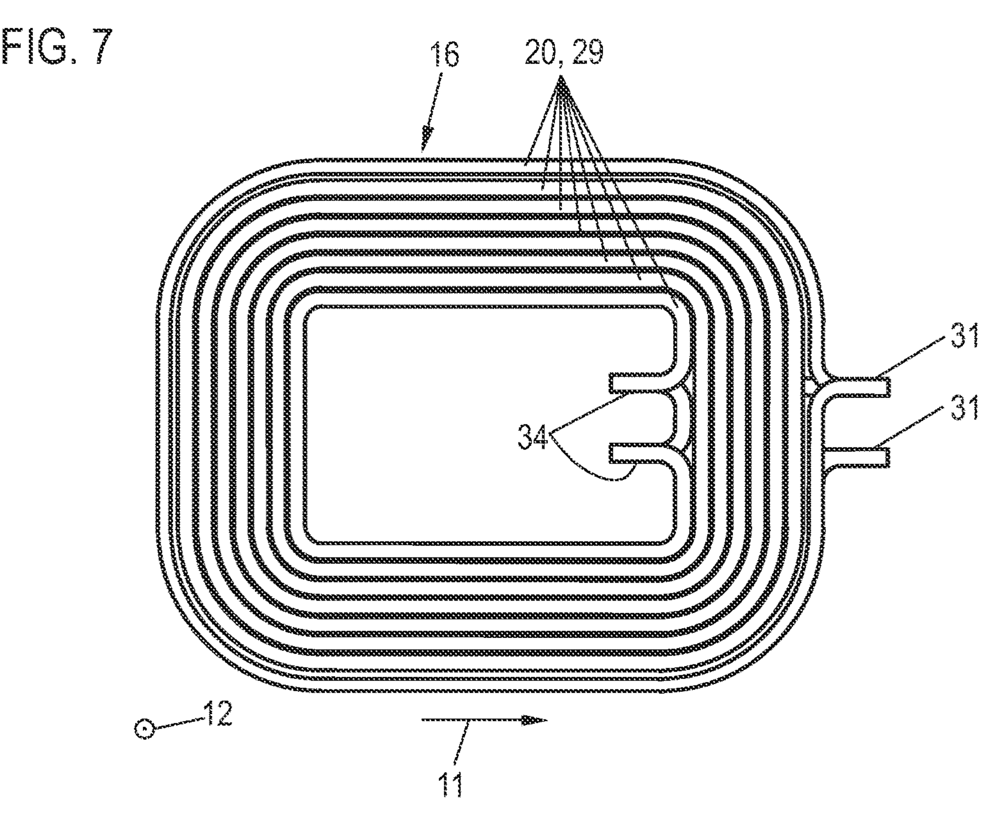
FIG. 7 shows a top view of one of the windings of the component of the electric machine of FIG. 2.
Figure 8:
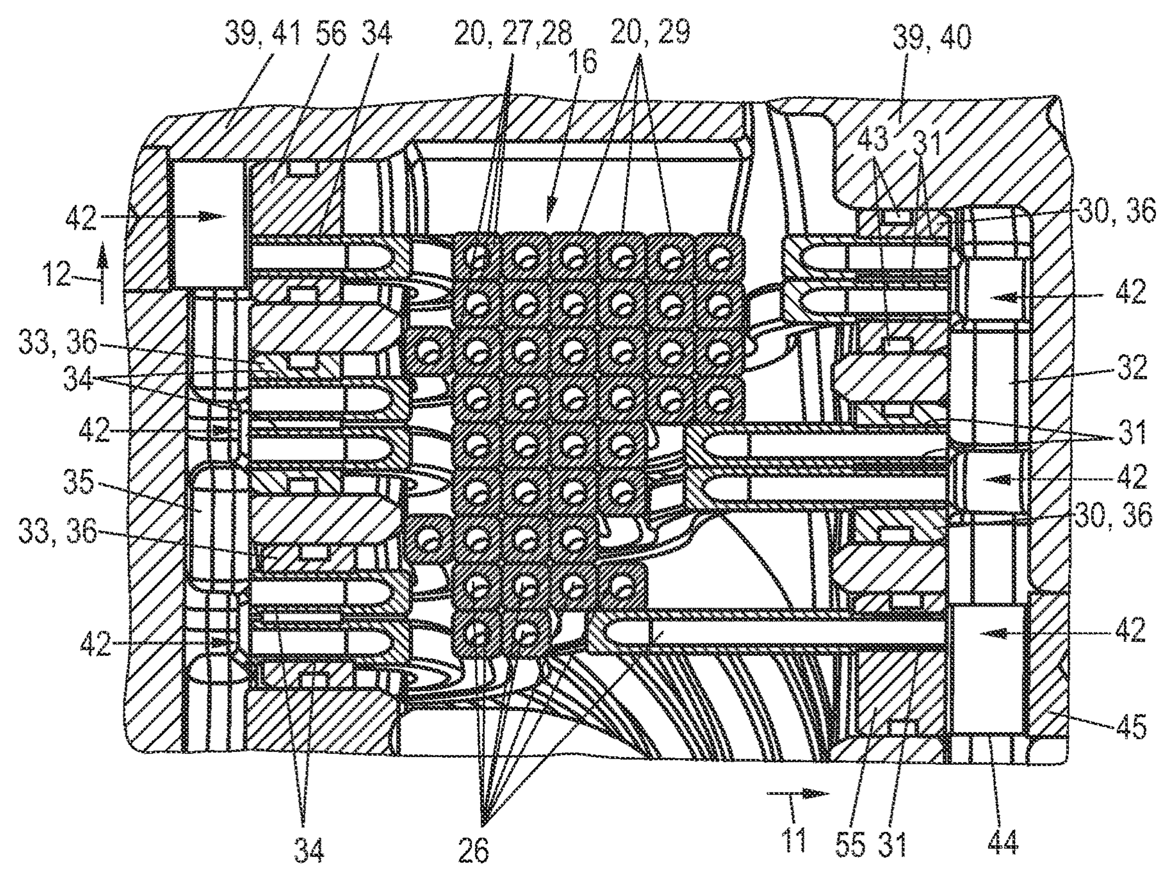
FIG. 8 shows a longitudinal section through the electric machine of the motor vehicle of FIG. 1.
Figure 9:
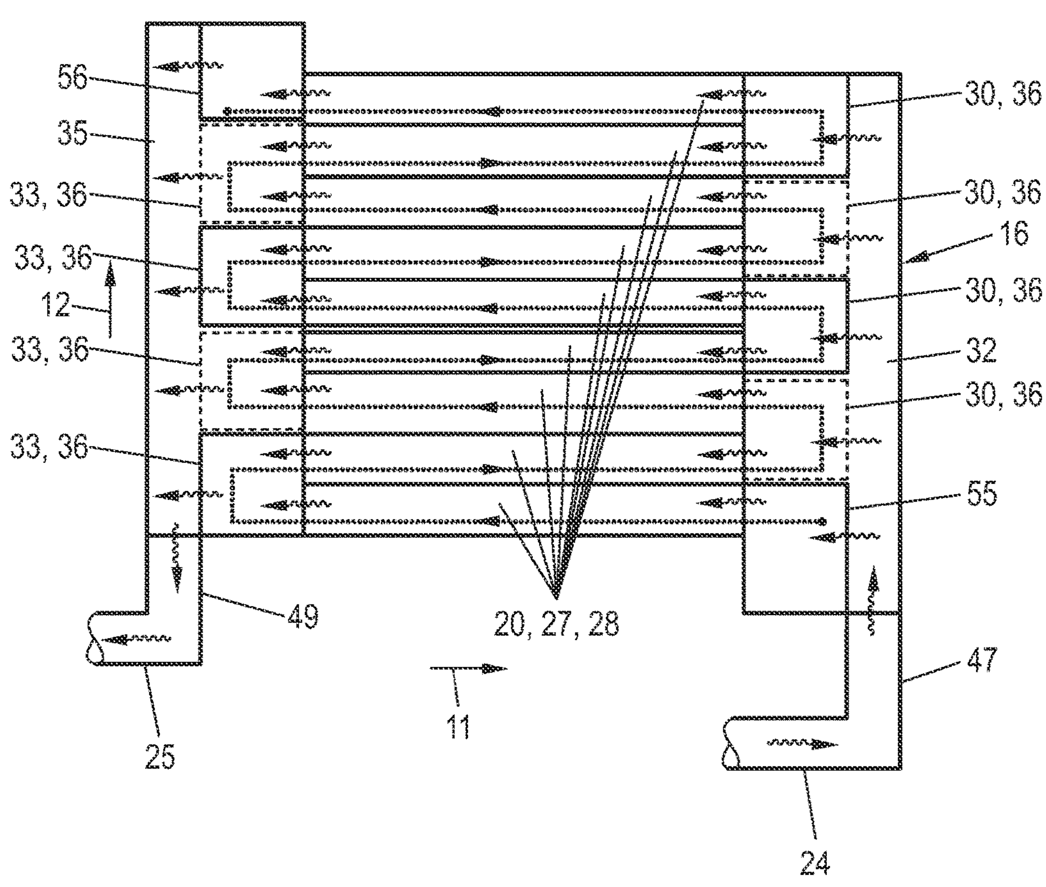
FIG. 9 shows a schematic diagram of one of the windings of the electric machine of FIG. 2.

Details of the structure of winding 16 are explained below with reference to FIGS. 5 to 9. FIGS. 5 to 7 show different, schematic views of one of windings 16, with other components of component 3 omitted for clarity. FIG. 5 shows winding 16 in a frontal view viewed along longitudinal direction 11. FIG. 6 shows winding 16 in a perspective view. FIG. 7 shows winding 16 in a top view viewed along radial direction 12. FIG. 8 shows a representation similar to that of FIG. 4, wherein the area of winding 16 is shown enlarged and the sectional plane is rotated by an angle about axis of rotation 10 in such a way that it runs centrally through connection components 30, 33, 36, which are explained in more detail below. FIG. 9 shows a schematic representation of FIG. 8.

As can be seen from FIGS. 5 to 9, winding 16 may have, with regard to radial direction 12, a plurality of winding layer groups 27 arranged one above the other, each of the winding layer groups 27 comprising, for example, a winding layer 28. Alternatively, at least one of winding layer groups 27 may, with regard to radial direction 12, also have a plurality of winding layers 28 arranged one above the other. In such an embodiment, each of winding layers 28 may include a plurality of winding turns 29 forming a spiral structure, with conductor wire 20 extending completely about tooth 15 exactly once within a winding turn 29. A total of nine winding layer groups 27 may be provided.

With regard to winding layer groups 27 one-piece conductor wire 20 forming respective winding layer group 27 may have an input-side end section 31 and an output-side end section 34. End sections 31, 34 may comprise the front ends or end faces of respective conductor wire 20, with an inlet or outlet opening of cooling channel 26 of the respective conductor wire 20 being arranged there in each case. As is particularly clear from FIGS. 7 and 8, end sections 31, 34 may protrude laterally and along longitudinal direction 11 from winding 16.

As can be seen in FIGS. 8 and 9, a plurality of fluidic input connection components 30 may be provided, by which input-side end sections 31 of two adjacent winding layer groups 27 may be connected to a supply chamber 32 which is fluidically connected upstream in such a way that these winding layer groups 27 are fluidically connected in parallel. A total of four fluidic input connection components 30 may be provided, which, as can be seen from FIG. 5, may be arranged offset from one another along radial direction 12. Due to the position of the sectional plane, only some of fluidic input connection components 30 can be seen in FIGS. 8 and 9, with non-visible fluidic input connection components 30 being indicated by dashed lines in FIG. 9. As can be seen from FIG. 9, with regard to the radial direction 12 outwards, the second and third, the fourth and fifth, the sixth and seventh and the eighth and ninth winding layer groups 27 are each connected with one of fluidic input connecting components 3.

Furthermore, a plurality of fluidic output connection components 33 may be provided, by which output-side end sections 34 of two adjacent winding layer groups 27 are fluidically connected to a discharge chamber 35, which is fluidically connected downstream of them. A total of four fluidic output connection components 33 may be provided, which, like fluidic input connection components 30, may be arranged offset from one another along radial direction 12. Fluidic input connection components 33, which are not visible in FIG. 9, are indicated by dashed lines. With regard to the radial direction 12 to the outside, the first and second, the third and fourth, the fifth and sixth, and the seventh and eighth winding layer groups 27 are each connected to one of fluidic output connection components 33.

With regard to fluidic connection components 30, 33, they may be fluidically connected upstream or downstream of an adjacent pair of winding layer groups 27. The cooling fluid stream flowing through supply chamber 32 may be divided between two downstream winding layer groups 27 by way of fluidic input connection components 30, with the resulting partial streams flowing parallel through winding layer groups 27 passing through fluidic output connection components 33 into discharge chamber 35 and being combined this way.

For establishing electrical contact with winding layer groups 27, electrical connection components 36 are provided, each of which connecting end sections 31, 34 of two adjacent winding layer groups 27 to one another, so that these winding layer groups 27 are electrically connected in series. Specifically, it is provided that end sections 31, 34 of conductor wires 20 of all pairwise adjacent winding layer groups 27 of winding 16 are connected to one another via an electrical connection component 36, so that all winding layer groups 27 of respective winding 16 are electrically connected in series one after the other. The flow of the electrical current is indicated in FIG. 9 by dotted arrows.

With regard to electrical connection components 36, part of them may form fluidic input connection components 30 and another part of them may form fluidic output connection components 33. Each electrical connection component 36 therefore may form a fluidic connection component 30, 33, and vice versa, such that a common connection component 30, 33, 36 is implemented in this regard. In this regard, it may generally be provided that at least one of electrical connection components 36 forms one of fluidic input connection components 30 or one of fluidic output connection components 36, such that these two components are a common component.

Figure 10:
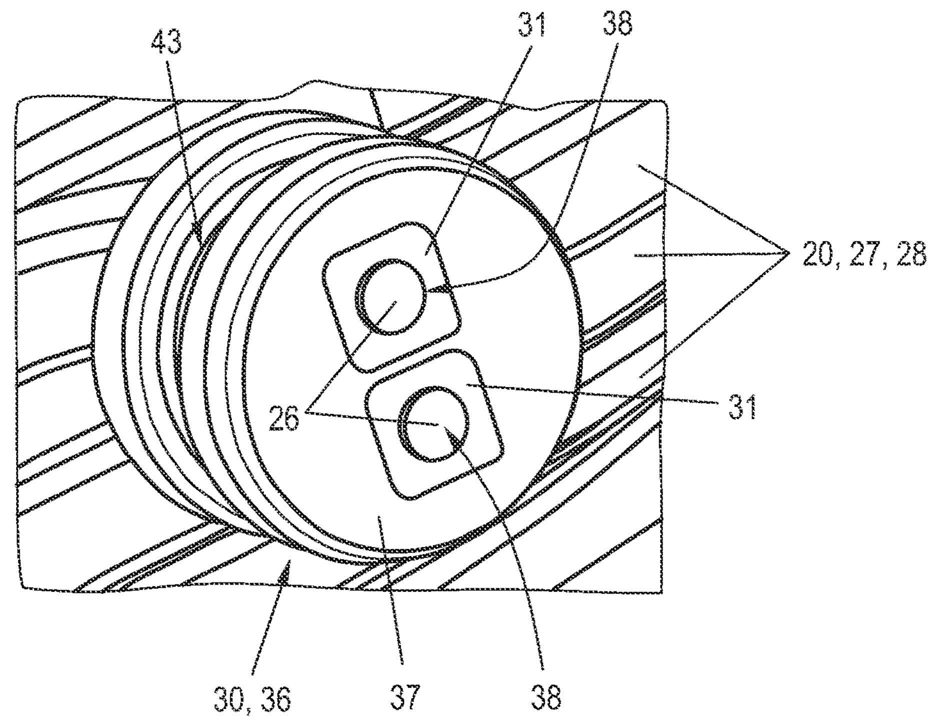
FIG. 10 shows an enlarged representation of box X of the representation in FIG. 6.

FIG. 10 shows a perspective and enlarged view of one of common connection components 30, 33, 36. Specifically shown is the uppermost of connection components 30, 33, 36 shown in FIG. 6, with the representation area of FIG. 10 being marked in FIG. 6 by box X. Accordingly, each of connection components 30, 33, 36 may include a base body 37, which includes an electrically conductive material, namely a metal such as copper. This creates the required electrical contact between respective adjacent winding layer groups 27. Base body 37 may include two channels 38, each forming a connection interface, through which the cooling fluid may be routed. For this purpose, respective end sections 31, 34 may be inserted into channels 38 or plugged in in a fluid-tight manner establishing the electrical contact. The inner cross section of channels 38 may correspond to the outer cross section of end section 31, 34 that has been plugged in. Instead of channels 38, base body 37 may have at least one chamber for routing the cooling fluid.

Figure 4:
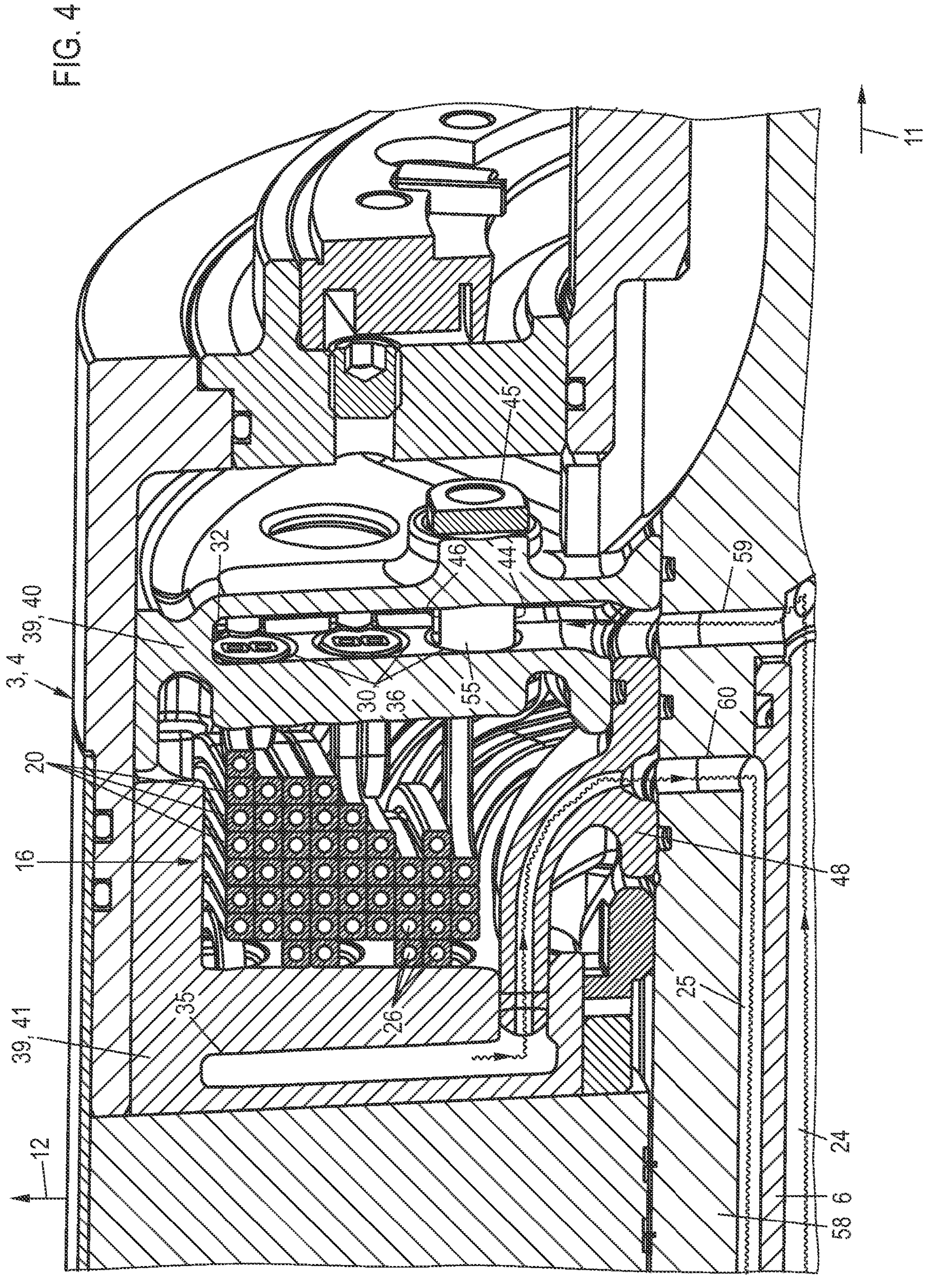
FIG. 4 shows an enlarged representation of an area of the longitudinal section shown in box IV of FIG. 2.
Figure 5:
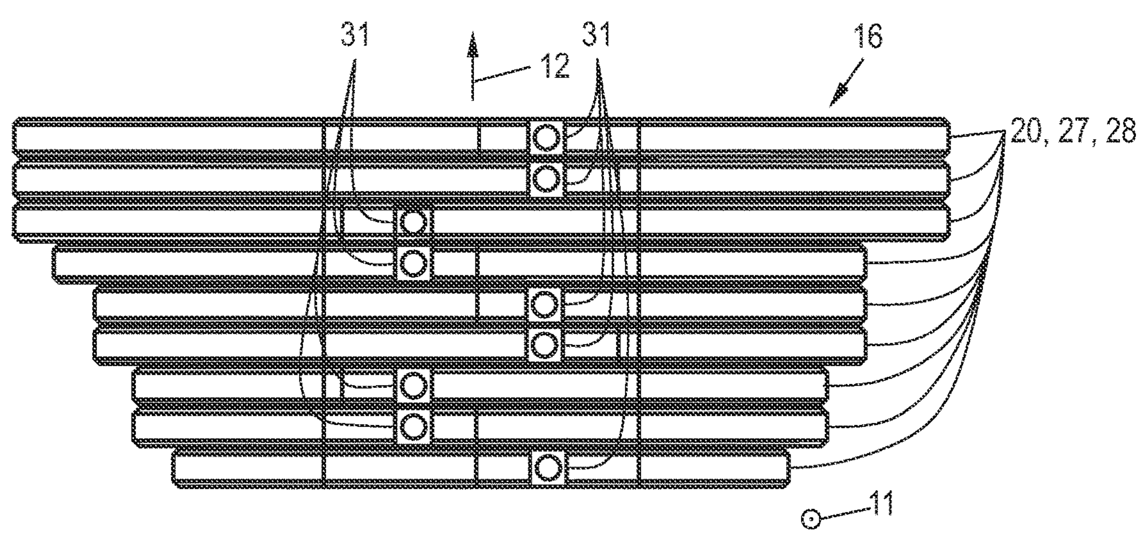
FIG. 5 shows a front view of one of the windings of the component of the electric machine of FIG. 2.

With reference to FIGS. 4, 8, and 9, an input connection component 55 and an output connection component 56 may be provided, which, apart from the aspects explained below, correspond to connection components 30, 33, 36. With reference to FIGS. 4 and 8 input connection component 55 may have a longitudinal section 44 which extends through supply chamber 32, such that an electrical contacting head 45, via which the electrical contact may be formed from the outside with respective winding 16, is arranged on the outside of a supply part 40, which will be explained below. A slot-like opening 46 may be provided laterally on longitudinal section 44, through which the cooling fluid may flow from supply chamber 32 into respective end section 31. Output connection component 56 may also have a longitudinal section 44 which extends through discharge chamber 35, such that an electrical contacting head 45, via which the electrical contact may be formed from the outside with the respective winding 16, is arranged on the outside of a discharge part 41 which will be explained below. A opening 46, such as a slot-like opening, may be provided laterally on longitudinal section 44 of output connection component 56, through which the cooling fluid may flow from respective end section 34 into discharge chamber 35.

Details with regard to the implementation of supply chamber 32 and discharge chamber 35 will be explained below with reference to FIGS. 4 and 8. That is to say, with regard to longitudinal direction 11, feed parts 39 may be arranged next to winding 16, such that winding 16 is arranged between feed parts 39. One of the feed parts 39 may be supply part 40, which includes supply chamber 32. The other feed parts 39 may be discharge part 41, which includes discharge chamber 35. Feed parts 39 may each be made of a plastic and have an annular shape that extends concentrically about rotor shaft 6. Accordingly, supply chamber 32 and discharge chamber 35 may also be formed annularly and arranged concentrically about the rotor shaft. Supply chamber 32 and discharge chamber 35 therefore each may form a common chamber which is fluidically connected upstream or downstream of all end sections 31, 34 of all windings 16.

As can be seen in particular from FIG. 8, each of feed parts 39 may have receiving openings 42 which open into supply chamber 32 or discharge chamber 35. Receiving openings 42 may be substantially cylindrical and adapted to the shape of connecting components 30, 33, 36 and components 55, 56. Connecting components 30, 33, 36 and components 55, 56 may be attached to feed part 39 by inserting them into one of receiving openings 42. Both receiving openings 42 and connecting components 30, 33, 36 as well as components 55, 56 may have locking means or devices 43 for attaching these components to one another. Locking grooves of connecting components 30, 33, 36 and components 55, 56 may be provided as locking means or devices 43, in which locking lugs of receiving openings 42 or respective supply part 39 engage.

Details with regard to the specific routing of the cooling fluid in cooling system 21 will now be explained with reference to FIGS. 2 and 4. After the cooling fluid has passed through conveying means or device 22, it may be introduced into an introduction chamber 47 arranged on the front side of rotor shaft 6 by way of an introduction lance, not shown in the figures. Through introduction chamber 47, the cooling fluid may flow into supply channel 24 via front openings 49 of rotor shaft 6, which may be arranged at the conveying device-side end thereof. After the cooling fluid has flowed through supply channel 24 and has reached a winding-side end of rotor shaft 6, it may exit from rotor shaft 6 via lateral openings 57 thereof due to the centrifugal force generated by the rotation of rotor shaft 6. The cooling fluid may then pass through first transverse bores 59 in rotor shaft sleeve 58 into supply chamber 32. The cooling fluid may then flow through winding 16 as described above and may then reach discharge chamber 35. From there, due to the cooling fluid that follows, it may be routed into a cooling fluid channel of a connecting part 48 which may open into second transverse bores 60 of rotor shaft sleeve 58. Second transverse bores 60 may open into discharge channel 25. This may have a hollow cylindrical or sleeve-like geometry and may extend between rotor shaft 6 and rotor shaft sleeve 58 along longitudinal direction 11, such that the cooling fluid flows back to the conveying means-side end of rotor shaft 6 and is supplied there to conveying means or device 22.

Although component 3 according to the disclosure forms rotor 4 of electric machine 2 in the exemplary embodiment explained, it is equally conceivable within the scope of the present disclosure that stator 5 implements component 3 and the related aspects explained. In such embodiments, in particular teeth 15, windings 16 and the aspects explained are implemented at stator 5.

German patent application no. 102023106337.5, filed Mar. 14, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric machine, comprising:

at least one component configured as a stator or a rotor, the at least one component comprising at least two teeth, each of the at least two teeth extending along a radial direction of the electric machine, and a winding wound about each tooth of the at least two teeth, wherein at least one of the windings comprises a plurality of winding layer groups arranged one above another in the radial direction, each of the winding layer groups comprising one or more winding layers arranged one above another, wherein the winding layer groups are each formed from a separate and electrically conductive conductor wire; and a cooling system configured such that a cooling fluid is routed through a hollow cross section of at least two electrically conductive conductor wires such that at least two of the winding layer groups are fluidically connected in parallel.

2. The electric machine according to claim 1, wherein the electric machine is configured as a salient pole synchronous machine.

3. The electric machine according to claim 1, further comprising one or more fluidic input connection components configured to fluidly couple input-side end sections of the electrically conductive conductor wires of at least two winding layer groups with one or more supply chambers, the one or more supply chambers being fluidly coupled upstream of the electrically conductive conductor wires of the at least two winding layer groups, such that the at least two winding layer groups are fluidly coupled in parallel.

4. The electric machine according to claim 1, further comprising one or more fluidic output connection components configured to fluidly couple output-side end sections of the electrically conductive conductor wires of at least two winding layer groups with one or more discharge chambers, each of the one or more discharge chambers being fluidly coupled downstream of the electrically conductive conductor wires of the at least two winding layer groups.

5. The electric machine according to claim 3, further comprising one or more feed parts arranged next to at least one of the windings in a longitudinal direction of the electric machine, wherein at least one of the one or more feed parts is configured as a supply part and includes at least one of one or more supply chambers, or wherein at least one of the one or more feed parts is configured as a discharge part and includes at least one of one or more discharge chambers.

6. The electric machine according to claim 5, wherein the component is configured as a rotor, wherein at least one of the one or more feed parts is formed annularly and is arranged concentrically about the or a rotor shaft of the component, the rotor shaft extending along the longitudinal direction and rotatably mounted, and wherein at least one of the one or more supply chambers and/or at least one of the one or more discharge chambers is formed annularly and arranged concentrically about the rotor shaft.

7. The electric machine according to claim 5, wherein at least one of the one or more fluidic input connection components and/or at least one of the one or more fluidic output connection components is coupled to the feed part.

8. The electric machine according to claim 1, further comprising one or more electrical connection components, each of the one or more electrical connection components connecting end sections of the electrically conductive conductor wires of two adjacent winding layer groups of one of the windings to one another, such that the two adjacent winding layer groups are electrically connected in series.

9. The electric machine according to claim 8, wherein the end sections of the electrically conductive conductor wires of all pairwise adjacent winding layer groups of a respective winding are connected to one another via an electrical connection component, such that all winding layer groups of the respective winding are electrically connected in series one after the other.

10. The electric machine according to claim 3, further comprising at least one common connection component configured to form one of the one or more fluidic connection components and one of one or more electrical connection components, each of the one or more electrical connection components connecting end sections of the electrically conductive conductor wires of two adjacent winding layer groups of one of the windings to one another, such that the two adjacent winding layer groups are electrically coupled in series.

11. The electric machine according to claim 10, wherein the at least one common connection component includes a base body comprising an electrically conductive material, the base body having at least one channel and/or at least one chamber configured such that the cooling fluid is routed therethrough.

12. The electric machine according to claim 1, wherein the component is configured as the rotor, wherein the cooling system is configured to form a cooling circuit in which the cooling fluid is conveyed by a conveying device, wherein a rotor shaft of the component extends along the longitudinal direction of the electrical machine and is rotatably mounted, the rotor shaft including or defining at least one supply channel and/or at least one discharge channel, the at least one supply channel and/or the at least one discharge channel extending at least in sections along the longitudinal direction of the rotor shaft, and wherein the at least one supply channel extends from the conveying device to at least one of the electrically conductive conductor wires having the hollow cross-section and/or the at least one discharge channel extends from at least one of the electrically conductive conductor wires having the hollow cross-section to the conveying device.

13. The electric machine according to claim 1, wherein the component comprises a plurality of parts, at least two parts of the plurality of parts each having at least one of the at least two teeth.

14. A component for an electric machine, configured as a stator or a rotor, comprising:

at least two teeth extending along a radial direction of the component; and a winding wound about each tooth of the at least two teeth, wherein at least one of the windings comprises a plurality of winding layer groups arranged one above the other in the radial direction, each of the plurality of winding layer groups comprising one or more winding layers arranged one above the other, wherein the winding layer groups are each formed from a separate and electrically conductive conductor wire, wherein a cooling fluid of a cooling system of the electric machine is routed through a hollow cross section of at least two electrically conductive conductor wires such that at least two of the plurality of winding layer groups are fluidly coupled in parallel.

15. A motor vehicle, comprising an electric machine according to claim 1.

16. The electric machine of claim 1, wherein the separate and electrically conductive conductor wire of each winding layer group includes a continuous cooling passage extending therethrough for routing the cooling fluid from an inlet end to an outlet end of the separate and electrically conductive conductor wire.

17. The component of claim 14, wherein the separate and electrically conductive conductor wire of each winding layer group includes a continuous cooling passage extending therethrough for routing the cooling fluid from an inlet end to an outlet end of the separate and electrically conductive conductor wire.

* * * * *